(12) United States Patent
Nordback

(10) Patent No.: US 8,699,042 B2
(45) Date of Patent: Apr. 15, 2014

(54) SYSTEMS AND METHODS FOR MULTI-MODE COLOR BLENDING

(75) Inventor: Kurt Nathan Nordback, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 872 days.

(21) Appl. No.: 12/138,028

(22) Filed: Jun. 12, 2008

(65) Prior Publication Data

US 2009/0310151 A1   Dec. 17, 2009

(51) Int. Cl.
*G06K 15/00* (2006.01)

(52) U.S. Cl.
USPC ............ 358/1.13; 358/1.9; 358/2.1; 358/518; 382/162; 345/592

(58) Field of Classification Search
USPC ............... 358/1.9, 1.15, 1.16, 1.17, 2.1, 1.13, 358/518; 382/173, 180, 162, 163, 167, 284; 345/592
See application file for complete search history.

(56) References Cited

U.S. PATENT DOCUMENTS

| | | | |
|---|---|---|---|
| 5,313,570 A | 5/1994 | Dermer et al. | |
| 5,315,691 A | 5/1994 | Sumiya et al. | |
| 5,555,094 A | 9/1996 | Lefebvre et al. | |
| 5,687,303 A | 11/1997 | Motamed et al. | |
| 5,748,331 A | 5/1998 | Köhler | |
| 6,169,607 B1 | 1/2001 | Harrington | |
| 6,178,007 B1 | 1/2001 | Harrington | |
| 6,179,485 B1 | 1/2001 | Harrington | |
| 6,195,674 B1 | 2/2001 | Elbourne et al. | |
| 6,201,551 B1 | 3/2001 | Loce et al. | |
| 6,222,648 B1 | 4/2001 | Wolf et al. | |

(Continued)

FOREIGN PATENT DOCUMENTS

| | | |
|---|---|---|
| EP | 924651 A2 * | 6/1999 |
| JP | 07-306938 A | 11/1995 |

(Continued)

OTHER PUBLICATIONS

Lorem Ipsum—"*All the facts—Lipsum Generator*," Oct. 11, 2012; http://web.archive.org/web/20020123143646//http://lipsum.com/ (Jan 2002), 1 page.

(Continued)

*Primary Examiner* — King Poon
*Assistant Examiner* — Jamares Q Washington
(74) *Attorney, Agent, or Firm* — Finnegan, Henderson, Farabow, Garrett & Dunner, L.L.P.

(57) ABSTRACT

Systems and methods are provided for performing blending operations on color documents described in a PDL in one of at least two modes. In a first mode, a specified colorspace associated with one PDL group is replaced with a second colorspace, wherein the second colorspace is native to a target device. Blending operations can then be performed on the PDL group using the second colorspace. In the second mode, blending operations are performed using the colorspace specified for the PDL group.

20 Claims, 3 Drawing Sheets

(56) References Cited

U.S. PATENT DOCUMENTS

| | | |
|---|---|---|
| 6,236,754 B1 | 5/2001 | Harrington |
| 6,237,079 B1 | 5/2001 | Stoney |
| 6,246,396 B1 | 6/2001 | Gibson et al. |
| 6,246,419 B1 | 6/2001 | Loce et al. |
| 6,252,677 B1 | 6/2001 | Hawes et al. |
| 6,259,456 B1 | 7/2001 | Gibson et al. |
| 6,269,184 B1 | 7/2001 | Spaulding et al. |
| 6,272,257 B1 | 8/2001 | Prokop |
| 6,275,607 B1 | 8/2001 | Shimizu et al. |
| 6,289,138 B1 | 9/2001 | Yip et al. |
| 6,302,522 B1 | 10/2001 | Rumph et al. |
| 6,311,258 B1 | 10/2001 | Gibson et al. |
| 6,313,842 B1 | 11/2001 | Tampieri |
| 6,324,305 B1 | 11/2001 | Holladay et al. |
| 6,336,180 B1 | 1/2002 | Long et al. |
| 6,349,379 B2 | 2/2002 | Gibson et al. |
| 6,360,007 B1 | 3/2002 | Robinson |
| 6,369,909 B1 | 4/2002 | Shima |
| 6,393,545 B1 | 5/2002 | Long et al. |
| 6,414,687 B1 | 7/2002 | Gibson |
| 6,421,140 B1 | 7/2002 | Hui |
| 6,490,696 B1 | 12/2002 | Wood et al. |
| 6,507,898 B1 | 1/2003 | Gibson et al. |
| 6,515,763 B1 | 2/2003 | Dermer et al. |
| 6,633,297 B2 | 10/2003 | McCormack et al. |
| 6,642,931 B1 | 11/2003 | Haikin et al. |
| 6,674,536 B2 | 1/2004 | Long et al. |
| 6,707,463 B1 | 3/2004 | Gibson et al. |
| 6,727,999 B1 | 4/2004 | Takahashi |
| 6,774,953 B2 | 8/2004 | Champion et al. |
| 6,781,720 B1 | 8/2004 | Klassen |
| 6,791,711 B1 | 9/2004 | Uekusa et al. |
| 6,792,485 B2 | 9/2004 | Aoki et al. |
| 6,819,782 B1 | 11/2004 | Imagawa et al. |
| 6,839,150 B1 | 1/2005 | Sugiura et al. |
| 6,839,461 B2 | 1/2005 | Tomomatsu |
| 6,862,110 B2 | 3/2005 | Harrington |
| 6,870,636 B2 | 3/2005 | Kulkarni |
| 6,873,432 B1 | 3/2005 | Thieret |
| 6,876,825 B2 | 4/2005 | Kurahashi et al. |
| 6,886,912 B2 | 5/2005 | Mantell |
| 6,891,970 B1 | 5/2005 | Suzuki |
| 6,906,834 B1 | 6/2005 | Kagawa et al. |
| 6,912,059 B1 | 6/2005 | Takahashi |
| 6,930,788 B1 | 8/2005 | Iwamoto et al. |
| 6,930,809 B1 | 8/2005 | Kagawa et al. |
| 6,954,288 B2 | 10/2005 | Uekusa et al. |
| 6,972,857 B2 | 12/2005 | Mantell et al. |
| 6,985,245 B1 | 1/2006 | Takahashi |
| 6,990,039 B2 | 1/2006 | Hirai |
| 6,995,864 B1 | 2/2006 | Sugiura et al. |
| 7,012,639 B1 | 3/2006 | Ishikawa et al. |
| 7,016,061 B1 | 3/2006 | Hewitt |
| 7,072,052 B1 | 7/2006 | Tanahashi et al. |
| 7,079,276 B2 | 7/2006 | Kimura |
| 7,084,994 B1 | 8/2006 | Koppich et al. |
| 7,092,654 B2 | 8/2006 | Kurahashi et al. |
| 7,116,821 B2 | 10/2006 | Lane et al. |
| 7,119,920 B2 | 10/2006 | Takahashi |
| 7,119,927 B2 | 10/2006 | Sugiura et al. |
| 7,123,381 B2 | 10/2006 | Klassen |
| 7,136,523 B2 | 11/2006 | Fukao et al. |
| 7,142,318 B2 | 11/2006 | Lopez et al. |
| 7,142,710 B2 | 11/2006 | Hung |
| 7,171,442 B1 | 1/2007 | Huang |
| 7,190,827 B2 | 3/2007 | Zeng et al. |
| 7,263,218 B2 | 8/2007 | Altenhof-Long et al. |
| 7,274,487 B2 | 9/2007 | Fukasawa |
| 7,283,266 B2 | 10/2007 | Yagita |
| 7,292,949 B2 | 11/2007 | Ding |
| 7,296,791 B2 | 11/2007 | Kurahashi et al. |
| 7,321,450 B2 | 1/2008 | Uekusa et al. |
| 7,359,530 B2 | 4/2008 | Wilson |
| 7,359,576 B1 | 4/2008 | Worthington et al. |
| 7,423,781 B2 | 9/2008 | Morimoto et al. |
| 7,538,896 B2 | 5/2009 | Tanaka |
| 7,598,964 B2 | 10/2009 | Olson |
| 7,804,630 B2* | 9/2010 | Nishikawa ............... 358/518 |
| 7,830,540 B2 | 11/2010 | Matsuda |
| 7,903,286 B2 | 3/2011 | Nordback |
| 8,432,572 B2 | 4/2013 | Nordback |
| 2001/0021971 A1 | 9/2001 | Gibson et al. |
| 2002/0051193 A1* | 5/2002 | Oki ............... 358/1.15 |
| 2002/0057446 A1 | 5/2002 | Long et al. |
| 2002/0063911 A1 | 5/2002 | Hui |
| 2002/0069236 A1 | 6/2002 | Jahnke |
| 2002/0075493 A1 | 6/2002 | Harrington |
| 2002/0075501 A1 | 6/2002 | Mantell et al. |
| 2002/0085224 A1 | 7/2002 | Price et al. |
| 2003/0016305 A1 | 1/2003 | Champion et al. |
| 2003/0034986 A1 | 2/2003 | Fukasawa |
| 2003/0098986 A1 | 5/2003 | Pop |
| 2003/0138142 A1 | 7/2003 | Hung |
| 2003/0142330 A1 | 7/2003 | Arakawa |
| 2003/0147088 A1 | 8/2003 | Kulkarni |
| 2003/0164971 A1 | 9/2003 | Kidani et al. |
| 2004/0017585 A1 | 1/2004 | Makishima et al. |
| 2004/0021882 A1 | 2/2004 | Kakutani |
| 2004/0021900 A1 | 2/2004 | Arakawa |
| 2004/0032615 A1 | 2/2004 | Kurakata |
| 2004/0042035 A1 | 3/2004 | Uejo |
| 2004/0042037 A1 | 3/2004 | Uejo |
| 2004/0042038 A1 | 3/2004 | Uejo |
| 2004/0101195 A1 | 5/2004 | Akaishi |
| 2004/0135845 A1 | 7/2004 | Mantell |
| 2004/0141642 A1 | 7/2004 | Zeng et al. |
| 2004/0151361 A1 | 8/2004 | Bedard et al. |
| 2004/0169876 A1 | 9/2004 | Takahashi |
| 2004/0184658 A1 | 9/2004 | Inoue |
| 2004/0212814 A1 | 10/2004 | Ishigami |
| 2004/0223173 A1 | 11/2004 | Arai |
| 2004/0223174 A1 | 11/2004 | Mikami |
| 2004/0252345 A1 | 12/2004 | Uekusa et al. |
| 2004/0257596 A1 | 12/2004 | Mestha et al. |
| 2005/0018228 A1 | 1/2005 | Takahashi |
| 2005/0021970 A1 | 1/2005 | Reese et al. |
| 2005/0027482 A1 | 2/2005 | Benaoudia et al. |
| 2005/0117398 A1 | 6/2005 | Hirai |
| 2005/0131907 A1 | 6/2005 | Matsuzawa et al. |
| 2005/0135672 A1 | 6/2005 | Altenhof-Long et al. |
| 2005/0180771 A1 | 8/2005 | Kurahashi et al. |
| 2005/0181346 A1 | 8/2005 | Heller |
| 2005/0185840 A1 | 8/2005 | Sugiura et al. |
| 2005/0213117 A1 | 9/2005 | Clark et al. |
| 2005/0259287 A1 | 11/2005 | Watanabe |
| 2005/0275856 A1 | 12/2005 | Oki |
| 2005/0289346 A1 | 12/2005 | Minagawa |
| 2006/0001728 A1 | 1/2006 | Murakami |
| 2006/0013477 A1 | 1/2006 | Pellar |
| 2006/0033956 A1 | 2/2006 | Takahashi |
| 2006/0034630 A1 | 2/2006 | Yabe |
| 2006/0061794 A1 | 3/2006 | Ito et al. |
| 2006/0071938 A1 | 4/2006 | Richardson et al. |
| 2006/0245016 A1 | 11/2006 | Fukao et al. |
| 2006/0262339 A1 | 11/2006 | Jacobs et al. |
| 2006/0274341 A1 | 12/2006 | Kumada et al. |
| 2006/0274939 A1 | 12/2006 | Yamada |
| 2007/0052996 A1* | 3/2007 | Ota ............... 358/1.15 |
| 2007/0057961 A1 | 3/2007 | Enami et al. |
| 2007/0086050 A1 | 4/2007 | Matsuda |
| 2007/0121172 A1 | 5/2007 | Hamada |
| 2007/0195353 A1 | 8/2007 | Tsunoda |
| 2007/0216930 A1 | 9/2007 | Jacobs |
| 2008/0005176 A1 | 1/2008 | Shimizu |
| 2008/0024807 A1 | 1/2008 | Matsuda |
| 2008/0030750 A1 | 2/2008 | Kato |
| 2009/0002765 A1 | 1/2009 | Nordback |
| 2009/0244563 A1 | 10/2009 | Nordback |
| 2009/0245628 A1 | 10/2009 | Nordback |

(56) References Cited

U.S. PATENT DOCUMENTS

2011/0075164 A1 3/2011 Nordback
2011/0157620 A1 6/2011 Nordback

FOREIGN PATENT DOCUMENTS

| JP | 09-052392 A | 2/1997 |
| JP | H09-322008 A | 12/1997 |
| JP | 2003-51939 A | 2/2003 |
| JP | 2006-345197 A | 12/2006 |

OTHER PUBLICATIONS

Non-Final Office Action issued in U.S. Appl. No. 12/650,925 dated Nov. 19, 2012.
Non-Final Office Action issued in U.S. Appl. No. 11/771,973 dated Aug. 13, 2012.
Final Office Action issued in U.S. Appl. No. 12/060,235 dated Aug. 10, 2012.
Non-Final Office Action issued in U.S. Appl. No. 12/571,131 dated Aug. 8, 2012.
Non-Final Office Action issued in U.S. Appl. No. 12/060,235 dated Feb. 14, 2012.
Final Office Action issued in U.S. Appl. No. 11/771,973 dated Dec. 15, 2011.
Final Office Action issued in U.S. Appl. No. 12/060,235 dated Oct. 14, 2011.
Non-Final Office Action issued in U.S. Appl. No. 11/771,973 dated Aug. 2, 2011.
Non-Final Office Action issued in U.S. Appl. No. 12/060,235 dated Jun. 2, 2011.
Notice of Allowance issued in U.S. Appl. No. 12/078,112 dated Nov. 1, 2010.
Final Office Action issued in U.S. Appl. No. 11/771,973 dated Aug. 16, 2010.
Non-Final Office Action issued in U.S. Appl. No. 12/078,112 dated May 11, 2010.
Non-Final Office Action issued in U.S. Appl. No. 11/771,973 dated Mar. 11, 2010.
U.S. Appl. No. 11/771,973, filed Jun. 29, 2007.
U.S. Appl. No. 12/060,235, filed Mar. 31, 2008.
U.S. Appl. No. 12/078,112, filed Mar. 27, 2008.
U.S. Appl. No. 12/571,131, filed Sep. 30, 2009.
U.S. Appl. No. 12/650,925, filed Dec. 31, 2009.
Notification of Refusal mailed Nov. 20, 2012, issued in related Japanese Patent Application No. 2008-166668.
Notice of Allowance dated Dec. 31, 2012, in U.S. Appl. No. 11/771,973, filed Mar. 14, 2007 Nordback.
Office Action dated Dec. 31, 2012, in U.S. Appl. No. 12/060,235, filed Mar. 31, 2008 Nordback.
Office Action mailed Jul. 9, 2013 in counterpart Japanese Patent Application 2009-132648.
Notification of Refusal with English language translation mailed by the Japanese Patent Office on Nov. 5, 2013, in counterpart Japanese Application No. 2009-132648.

* cited by examiner

SYSTEMS AND METHODS FOR MULTI-MODE COLOR BLENDING

BACKGROUND

1. Field of the Invention

The present invention relates to the field of printing and in particular, to systems and methods to implement multiple mode color blending for print devices.

2. Description of Related Art

Pixels generated by a color printer typically consist of colors from multiple color planes. For example, in a color printer that uses cyan, magenta, yellow, and black ("CMYK"), a single pixel can include color from one or more of the four color planes. A wide range of colors may be produced by a printer when colors from constituent color planes are combined with differing intensities. Color for image data is typically specified in some color space in a page description language ("PDL"), which may differ from the native color space of the target imaging or printing device.

Several modern page description languages ("PDLs") allow for blending of colors based on some model of opacity data. In some situations, opacity data may be specified using an alpha channel, and is known as "alpha" data. In general, blending is a convex combination of colors allowing the representation of transparency and/or translucency effects. A convex combination is a linear combination of the colors, where all coefficients are non-negative and add up to 1. For example, when an alpha channel is used, the value of alpha in a color code can range from 0.0 to 1.0, where 0.0 may represent a fully transparent color, while 1.0 may represent a fully opaque color. Alpha values can be used to specify how a set of objects in a PDL, for example, interact with each other to form a final composed object. The result of such blending is typically dependent both on the opacity (alpha) value and on the color space in which the blending is performed. PDLs may allow the specification of the colorspace in which blending is to be performed. For example, in Adobe™ Portable Document Format ("PDF") PDL, each object group in a print job may be blended in its own color space. Similarly, in Microsoft™ XML Paper Specification ("XPS") PDL, a user can specify the blending color space for each page. In many situations, such as the PDLs described above, the color spaces utilized for blending may not have any relation to the native color space of the target device on which the job is to be displayed. Therefore, blending operations may involve repeated colorspace conversions.

Typically, flexibility in blending schemes invites color conversion costs. For example, in PDF, a stack of nested PDF groups may have distinct color spaces. As each PDF group is blended into its parent, color space conversion is performed. Color space conversion is also performed when the outermost group, termed the page group, is converted to the color space of the native device. Similarly, in XPS, color space conversion is performed from the blending color space specified for a page to the color space of the native device. Because color conversion can be computationally expensive, the conversions above can constitute a significant portion of the total rasterization time.

In some PDLs, the common color space to be used for blending two objects may be specified. This approach also fails to effectively reduce the total number of color space conversions during the course of the print job. Other approaches, which also depend on using directives in the print job, rely on the analysis of data in the print job or other heuristics to speed up rasterization. Approaches relying on print job directives are not generic enough to be widely applicable and effective.

In a further approach used in Konica-Minolta™ printers C550 and 5570, when blending was specified in an RGB color space for data in a CMYK space, the blending operation was carried out by converting from CMYK to RGB using a canonical conversion algorithm before blending; blending the objects in RGB; and then converting the objects back to CMYK. All other blending operations were performed in the native color space of the printer. This approach reduced the number of conversions when blending was not specified in an RGB space for data in CMYK space. However, for the fairly common case where blending was specified in an RGB color space using data in CMYK space, there was no improvement in speed. In addition, because canonical transformations ignore details of the specific CMYK space involved in the blending, such transformations can also result in a loss of color accuracy. In all other cases (not involving blending in an RGB color space for data in a CMYK space) blending was performed in the native color space of the printer resulting in a loss of color accuracy. Consequently, users of these printers were deprived of both flexibility and color accuracy.

Thus, there is a need for systems and methods that provide multiple mode color blending functionality at a low implementation and computational cost, while permitting preservation of printed color output quality.

SUMMARY

Embodiments consistent with the present invention include systems and methods for performing methods for processing color documents described in a PDL using one of at least two modes. The modes comprise a first mode wherein a first specified colorspace associated with at least one PDL group is replaced with a second colorspace, which is native to a target device. Blending operations are then performed on the PDL group using the second colorspace. In the second mode blending operations are performed on the PDL group using the first specified colorspace.

Embodiments of the present invention also relate to software, firmware, and program instructions created, stored, accessed, or modified by processors using computer-readable media or computer-readable memory. The methods described may be performed by systems, including a computer and/or a printing device.

These and other embodiments are further explained below with respect to the following figures.

DETAILED DESCRIPTION

In accordance with embodiments reflecting various features of the present invention, systems and methods for processing color documents using one of at least two blending modes are presented. In some embodiments, the color documents may be described in the form of a PDL description and an intermediate printable data of objects generated from the PDL description may take the form of a display list.

Figure 1:
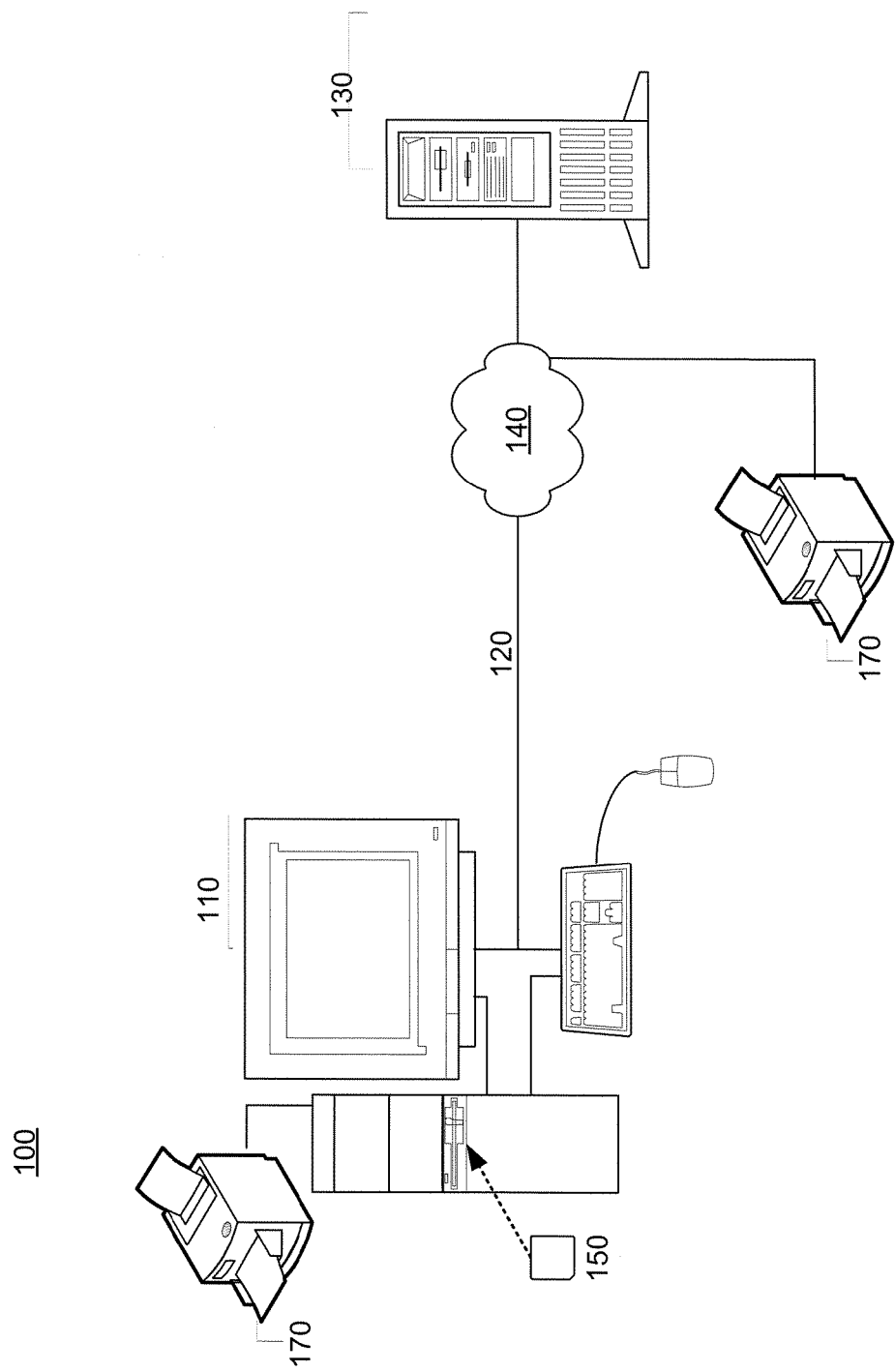
FIG. 1 shows a block diagram illustrating components in a system for printing documents according to some embodiments of the present invention.

FIG. 1 shows a block diagram illustrating components in an exemplary system for printing documents. An application for implementing methods for processing color documents described in a PDL using one of at least two blending modes may be deployed on a network of computers and printing devices, as shown in FIG. 1, that are connected through communication links that allow information to be exchanged using conventional communication protocols and/or data port interfaces.

As shown in FIG. 1, exemplary system 100 includes computers including a computing device 110 and a server 130. Further, computing device 110 and server 130 may communicate over a connection 120, which may pass through network 140. Computing device 110 may be a computer workstation, desktop computer, laptop computer, or any other computing device capable of being used in a networked environment. Server 130 may be a platform capable of connecting to computing device 110 and other devices (not shown). Computing device 110 and server 130 may be capable of executing software (not shown) that allows the printing of documents using printers 170.

Document processing software running on computing device 110 and/or server 130 may allow users to view, edit, process, and store documents conveniently. Pages to print in a document may be described in a page description language ("PDL"). PDL's may include Adobe™ PostScript, Adobe™ PDF, HP™ PCL, Microsoft™ XPS, IBM™ Personal Printer Data Stream ("PPDS"), SVG (an XML-based graphics description language primarily developed for the World Wide Web), Diablo, Device Independent ("DVI"), Intelligent Printer Data Stream ("IPDS"), Kyocera Page Description Language ("KPDL"), Samsung™ Printer Language ("SPL"), Advanced Function Presentation ("AFP"), and variants thereof. A PDL description of a document provides a high-level description of each page in a document. This PDL description is often translated to a series of lower-level printer-specific commands when the document is being printed.

The translation process from PDL to lower-level printer-specific commands may be involved and depend on the features and capabilities offered by exemplary printer 170. For example, printer 170 may process its data in stages. In a first stage, printer 170 may parse PDL commands and break down high-level instructions into a set of lower level instructions called primitives. These primitives may be fed to a subsequent stage in exemplary printer 170, which may use them to determine where to place marks on a page. In some instances, each primitive may be processed as it is generated. In other systems, a large set of primitives may be generated, stored, and then processed. For example, the primitives needed to describe a single page may be generated, stored in a list, and then processed. A set of stored primitives is termed an intermediate list or a display list.

Exemplary printer 170 includes devices that produce physical documents from electronic data including, but not limited to, laser printers, ink-jet printers, LED printers, plotters, facsimile machines, and digital copiers. Exemplary printer 170 may also be capable of directly printing documents received from computing device 110 or server 130 over connection 120. In some embodiments such an arrangement may allow for the direct printing of documents, with (or without) additional processing by computing device 110 or server 130. The processing of documents, which may contain one or more of text, graphics, and images, can be distributed. Thus, computing device 110, server 130, and/or the printer may perform portions of document print processing such as half-toning, color matching, and/or other manipulation processes before a document is physically printed by printer 170.

Computing device 110 also contains removable media drive 150. Removable media drive 150 may include, for example, 3.5 inch floppy drives, CD-ROM drives, DVD ROM drives, CD±RW or DVD±RW drives, USB flash drives, and/or any other removable media drives. Portions of applications may reside on removable media and be read by computing device 110 using removable media drive 150 prior to being acted upon by system 100.

Connection 120 couples computing device 110, server 130, and printer 170 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as parallel ports, serial ports, Ethernet®, USB, SCSI, FIREWIRE, and/or coaxial cable ports for transmission of data through the appropriate connection.

Network 140 could include a Local Area Network (LAN), a Wide Area Network (WAN), or the Internet. In some embodiments, information sent over network 140 may be encrypted to ensure the security of the data being transmitted. Printer 170 may be connected to network 140 through connection 120. Exemplary printer 170 may also be connected directly to computing device 110 and/or server 130. System 100 may also include other peripheral devices (not shown). An application to implement methods for processing color documents using one of at least two blending modes may be deployed on one or more of the exemplary computers or printers, as shown in FIG. 1. For example, computing device 110 could execute software that may be downloaded directly from server 130, and portions of the application may also be executed by exemplary printer 170.

Figure 2:
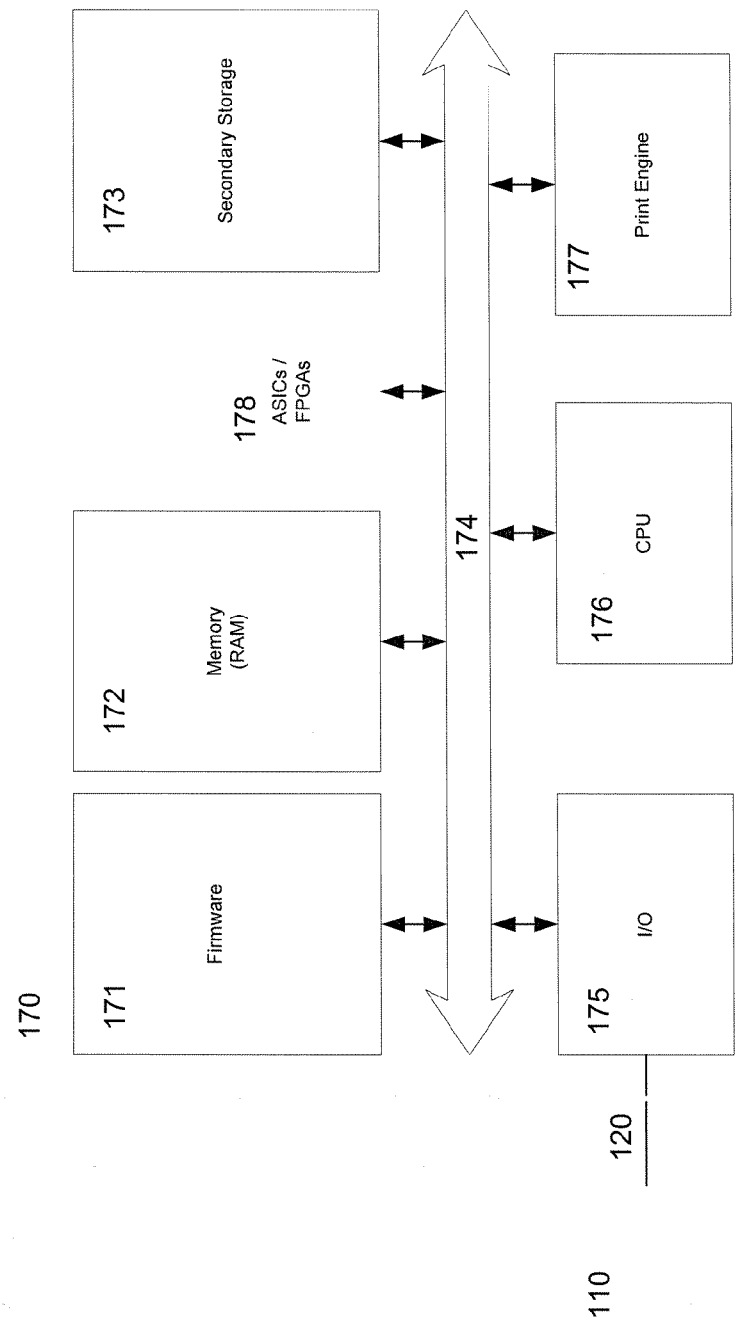
FIG. 2 shows a high level block diagram of an exemplary printer.

FIG. 2 shows a high-level block diagram of exemplary printer 170. Exemplary printer 170 may contain bus 174 that couples CPU 176, firmware 171, memory 172, input-output ports 175, print engine 177, and secondary storage device 173. Exemplary Printer 170 may also contain other Application Specific Integrated Circuits (ASICs), and/or Field Programmable Gate Arrays (FPGAs) 178 that are capable of executing portions of an application to print or process documents. Exemplary printer 170 may also be able to access secondary storage or other memory in computing device 110 using I/O ports 175 and connection 120. In some embodiments, printer 170 may also be capable of executing software including a printer operating system and other appropriate application software. Exemplary printer 170 may allow paper sizes, output trays, color selections, and print resolution, among other options, to be user-configurable.

Exemplary CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including but not limited to a boot-up sequence, pre-defined routines including routines for image processing, compression, color space conversion, blending, trapping, document processing, and other code. In some embodiments, code and data in firmware 171 may be copied to memory 172 prior to being acted upon by CPU 176. Routines in firmware 171 may include code to translate page descriptions received from computing device 110 to display lists. In some embodiments, firmware 171 may include rasterization routines to convert display commands in a display list to an appropriate rasterized bit map and store the bit map in memory 172. Firmware 171 may also include memory management routines. Data and instructions in firmware 171 may be upgradeable using one or more of computer 110, network 140, removable media coupled to printer 170, and/or secondary storage 173.

Exemplary CPU 176 may act upon instructions and data and provide control and data to ASICs/FPGAs 178 and print engine 177 to generate printed documents. ASICs/FPGAs 178 may also provide control and data to print engine 177. FPGAs/ASICs 178 may also implement one or more of color space conversion, blending, translation, trapping, compression, and rasterization algorithms.

Exemplary computing device 110 may transform document data into a first printable data. In some embodiments, the first printable data may correspond to a PDL description of a document. Then, the first printable data can be sent to printer 170 for transformation into intermediate printable data. In some embodiments, the translation process from a PDL description of a document to the final printable data comprising of a series of lower-level printer-specific commands may include the generation of intermediate printable data comprising of display lists of objects. Display lists may hold one or more of text, graphics, and image data objects and, in some instances, one or more types of data objects in a display list may correspond to an object in a user document.

If more than two objects are present, the device may determine if parts of the objects overlap. For example, pixels in image objects may be associated with color and transparency characteristics. Transparency is an indication of the degree to which any pixel underlying a superimposing pixel may be seen through the superimposing pixel. Effects such as transparency or translucency effects can be implemented using blending, where one color (such as a foreground color) is combined with another color (such as a background color) using transparency information (which can be obtained from an alpha channel) to create a third color. Because blending operations are colorspace specific, a colorspace in which the blending operation is to be performed is often specified. In some instances, the colorspace may be inferred from the context or from language syntax.

Display lists, which may aid in the generation of intermediate printable data, may be stored in memory 172 or secondary storage 173. Exemplary secondary storage 173 may be an internal or external hard disk, memory stick, or any other memory storage device capable of being used by system 200. In some embodiments, the display list may reside and be transferred between one or more of printer 170, computing device 110, and server 130 depending on where the document processing occurs. Memory to store display lists may be a dedicated memory or form part of general purpose memory, or some combination thereof. In some embodiments, memory to hold display lists may be dynamically allocated, managed, and released as needed. Printer 170 may transform intermediate printable data into a final form of printable data and print according to this final form. The process of transforming document data into a final printable data is termed rasterization. Depending on features and capabilities of the PDL being processed, as well as the print processing system, blending may occur at one or more points during the rasterization process.

Figure 3:
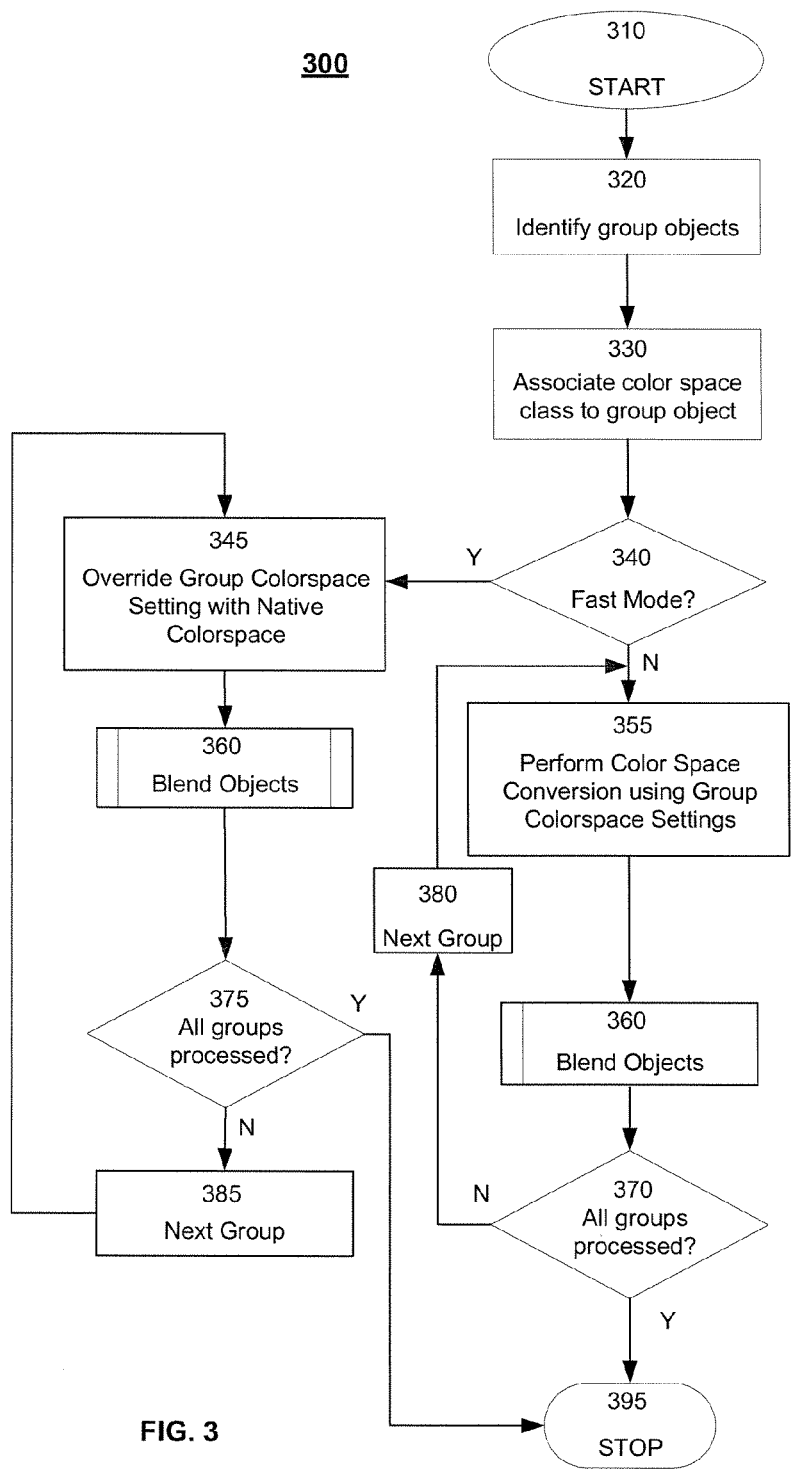
FIG. 3 shows an exemplary flowchart illustrating steps in a method for processing color documents.

FIG. 3 shows a flowchart 300 illustrating steps in an exemplary method for performing blending. The process may start in step 310 with the initiation of a print job. For simplicity of description, the target device for the method exemplified in the flowchart has been assumed to be printer 170. In general, the exemplary method of flowchart 300 may be applied to blending for any target device, with appropriate modifications as would be apparent to one of reasonable skill in the art. In some embodiments, some or all of the method may be performed directly on the target device. In some embodiments, the method may be carried on a computing device coupled to the target device.

The target device may be a printer, plotter, facsimile device, multi-function device, display device, and/or a computing device. In addition, appropriate modifications may be made based on the nature and capabilities of individual PDLs and language processor implementations. The exemplary method illustrated by flowchart 300, may be performed by printer 170 using one or more of CPU 176, ASICs/FPGAs 178, memory 172, and/or secondary storage 173.

In step 320, group objects or constructs ("groups") specified directly or implicitly in the PDL may be identified. In some embodiments, a language processor for the PDL may parse the PDL specification for the print job and identify groups. The minimum granularity at which a set of one or more objects may be subjected to blending operations with an explicit or implicit associated colorspace can be termed a group. Groups may be structured hierarchically, nested, and/or composed of other lower level groups. In general, a group in a PDL may be specified by the PDL, or may be inferred from the types and/or order of operations permitted on language objects. For example, in PDF™, groups may be nested and a stack of nested PDF™ groups may have different colorspaces. During processing, each group may be blended into its parent, and the outermost group (also called a page group in PDF™) can be converted to the native colorspace of the printer. As another example, nested groups in XPS™, which are called canvases, have common colorspaces. However, a different blending colorspace may be specified for a page that comprises of nested groups, and the page may be eventually rendered in the native colorspace of the peripheral device. In step 330, a colorspace may be associated with each group identified in step 320. Some PDLs may allow a colorspace to be specified for a group, and the specified colorspace may be associated with the group.

In step 340, the algorithm may determine if the user has selected "fast mode" printing. If fast mode printing has been enabled, then in step 345, the colorspace associated with the group may be overridden and can be replaced with the native colorspace of printer 170. Next, pre-defined routine 360 to perform blending may be invoked. In fast mode, pre-defined routine 360 may perform blending using the native colorspace of printer 170 rather than the original colorspace associated with the group. In some embodiments, pre-defined routine 360 may be stored in firmware 171 and copied to memory 172 of printer 170, where it may then be invoked by CPU 176.

In step 375, the algorithm determines if all groups in the print job have been processed. If additional groups remain to be processed, the algorithm may proceed to the next group in step 385 and iterate through step 345, routine 360, and steps 375, and 385. For example, a hierarchy of nested groups may be processed in fast mode so that each nested group is blended with its parent, wherein the blending for each group is carried out using native colorspace of printer 170. When all groups have been processed, the algorithm may terminate in step 395. Because, color conversions for blending are performed in the native color space of the printer 170, the number of colorspace conversions is minimized when a print job is processed in fast mode. In some embodiments, the use of fast mode may involve less computational cost and permit a higher throughput of printed pages, thereby allowing a greater number of pages to be printed in a given time interval.

If fast mode printing has not been selected, then, a colorspace conversion is performed using specified group colorspace settings in step 355, prior to the invocation of pre-defined routine 360 for blending.

In some embodiments, in pre-defined routine 360, blending within a group can occur in the group's colorspace, and data can remain in that colorspace until the group is incorporated into a parent group. Therefore, elemental input objects can be converted to the colorspace associated with their group, and after that group has been processed the resulting data can be converted to the parent group's colorspace.

In step 370, the algorithm determines if all groups in the print job have been processed. If additional groups remain to be processed, the algorithm may proceed to the next group in step 380 and iterate appropriately through steps 350, 355, routine 360, and steps 370, and 380 until no more groups remain to be processed. When all groups have been processed, the algorithm may terminate in step 395. In some embodiments, one or more additional steps (not shown) may be performed after all groups have been processed to blend a root group into the native colorspace of printer 170, if the color space of the root group does not match the native color space of printer 170. Because, color conversions for blending are performed as specified in the colorspaces associated with groups, color accuracy is maintained when a print job is processed in the second or non-fast mode.

Exemplary method 300, allows users flexibility in determining printed output. For example, if quick copies are desired then fast mode may be selected, whereas a regular or non-fast mode may be used for color-accurate copies. Because print speed is often critical when documents are being created, edited, and/or reviewed, fast mode allows users the option of generating printed copies quickly. On the other hand, color-accuracy is typically desired for "final" versions of documents, and the use of a second or non-fast mode permits the creation of color-accurate printed documents.

In one embodiment, a method for performing blending may also be performed using recursive techniques. Exemplary pseudocode illustrating one approach to implementing blending operations recursively is shown below. Explanatory comments are delimited by "/*" and "*/" in the pseudocode below. In the example below, routines ProcessPageNormal and ProcessGroupNormal are invoked when using a "normal mode" (or non-fast mode) for blending operations, while ProcessPageFast and ProcessGroupFast are invoked when using a "fast mode" for blending operations.

```
/*Normal Mode*/
    ProcessPageNormal(page)
    {
        ProcessGroupNormal(pagegroup) /*pagegroup is root group */
        convert pagegroup to native device colorspace
    }
    ProcessGroupNormal(grp)      /* grp is a group */
    {
        for each object in grp {
            if (object is a group) {
                ProcessGroupNormal(object)
            }
            convert object to colorspace of grp
            blend object into grp
        }
    }
/*Fast Mode */
    Process Page Fast(page)
    {
        ProcessGroupFast(pagegroup) /* pagegroup is root group */
    }
```

-continued

```
ProcessGroupFast(grp) /* grp is a group */
{
    for each object in grp {
        if (object is a group) {
            ProcessGroupFast(object)
        }
        convert object to native device colorspace
        blend object into grp
    }
}
```

As indicated in the exemplary pseudocode, in normal mode, when a root group such as a page group is encountered ProcessGroupNormal can be invoked from ProcessPageNormal. ProcessGroupNormal can then be invoked recursively so that a group is processed within its own rasterization space before the group undergoes colorspace conversion and blending into a parent group. As shown in the pseudocode above, in fast mode, when a root group such as a page group is encountered ProcessGroupFast can be invoked from ProcessPageFast. A similar recursive invocation of ProcessGroupFast can then occur except that, in fast mode, after being processed in its rasterization space, the group is converted to the native colorspace of the target device before being blended into a parent group.

In some embodiments, a program for conducting the above process can be recorded on computer-readable media 150 or computer-readable memory. These include, but are not limited to, Read Only Memory (ROM), Programmable Read Only Memory (PROM), Flash Memory, Non-Volatile Random Access Memory (NVRAM), or digital memory cards such as secure digital (SD) memory cards, Compact Flash™, Smart Media™, Memory Stick™, and the like. In some embodiments, one or more types of computer-readable media may be coupled to printer 170. In certain embodiments, portions of a program to implement the systems, methods, and structures disclosed may be delivered over network 140.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A method for processing at least one color document described in a PDL using one of at least two modes, wherein the color document comprises a hierarchy of nested PDL groups, the method comprising:
    determining if a user has enabled a fast mode printing;
    processing the at least one color document using a first mode if the user has enabled the fast mode printing, the first mode comprising:
        replacing a first specified colorspace associated with a first PDL group in the hierarchy of nested PDL groups with a second colorspace, wherein the second colorspace is native to a target device,
        blending the first PDL group with a first parent PDL group in the hierarchy using the second colorspace, and
        iteratively blending subsequent PDL groups with subsequent parent PDL groups using the second colorspace until all nested PDL groups have been processed; and
    processing the at least one color document using a second mode if the user has not enabled the fast mode printing, the second mode comprising:

blending the first PDL group with the first parent PDL group using a third colorspace associated with the first parent PDL group, and iteratively blending subsequent PDL groups with subsequent parent PDL groups using colorspaces associated with the subsequent parent PDL groups respectively until all nested PDL groups have been processed;

wherein the first mode minimizes the number of colorspace conversions required for executing the blending operations, and the second mode maintains color accuracy of the blending operations.

2. The method of claim 1, wherein the PDL used to describe the at least one color document comprises one or more of:
PDF;
XPS;
PostScript;
PCL;
PPDS;
SVG;
Diablo;
SPL;
IPDS; and
DVI.

3. The method of claim 1, wherein the method is performed on the target device.

4. The method of claim 3, wherein the target device is a printer.

5. The method of claim 1, wherein the method is performed on a computing device coupled to the target device.

6. The method of claim 5, wherein the target device is a printer.

7. A non-transitory computer-readable medium that stores instructions, which when executed by a processor perform steps in a method for processing at least one color document described in a PDL using one of at least two modes, wherein the color document comprises a hierarchy of nested PDL groups, the method comprising:

determining if a user has enabled a fast mode printing;

processing the at least one color document using a first mode if the user has enabled the fast mode printing, the first mode comprising:

replacing a first specified colorspace associated with a first PDL group in the hierarchy of nested PDL groups with a second colorspace, wherein the second colorspace is native to a target device, blending the first PDL group with a first parent PDL group in the heirarchy using the second colorspace, and iteratively blending subsequent PDL groups with subsequent parent PDL groups using the second colorspace until all nested PDL groups have been processed; and processing the at least one color document using a second mode if the user has not enabled the fast mode printing, the second mode comprising:

blending the first PDL group with the first parent PDL group using a third colorspace associated with the first parent PDL group, and iteratively blending subsequent PDL groups with subsequent parent PDL groups using colorspaces associated with the subsequent parent PDL groups respectively until all nested PDL groups have been processed;

wherein the first mode minimizes the number of colorspace conversions required for executing the blending operations, and the second mode maintains color accuracy of the blending operations.

8. The computer-readable medium of claim 7, wherein the PDL used to describe the at least one color document comprises one or more of:
PDF;
XPS;
PostScript;
PCL;
PPDS;
SVG;
Diablo;
SPL;
IPDS; and
DVI.

9. The computer-readable medium of claim 7, wherein the method is performed on the target device.

10. The computer-readable medium of claim 9, wherein the target device is a printer.

11. The computer-readable medium of claim 7, wherein the method is performed on a computing device coupled to the target device.

12. The computer-readable medium of claim 11, wherein the target device is a printer.

13. A non-transitory computer readable memory containing instructions for controlling a processor to perform steps in a method for processing at least one color document described in a PDL using one of at least two modes, wherein the color document comprises a hierarchy of nested PDL groups, the method comprising:

determining if a user has enabled a fast mode printing;

processing the at least one color document using a first mode if the user has enabled the fast mode printing, the first mode comprising:

replacing a first specified colorspace associated with a first PDL group in the hierarchy of nested PDL groups with a second colorspace, wherein the second colorspace is native to a target device, blending the first PDL group with a first parent PDL group in the hierarchy using the second colorspace, and iteratively blending subsequent PDL groups with subsequent parent PDL groups using the second colorspace until all PDL groups have been processed; and processing the at least one color document using a second mode if the user has not enabled the fast mode printing, the second mode comprising:

blending the first PDL group with the first parent PDL group using a third colorspace associated with the first parent PDL group, and iteratively blending subsequent PDL groups with subsequent parent PDL groups using colorspaces associated with the subsequent parent PDL groups respectively until all nested PDL groups have been processed;

wherein the first mode minimizes the number of colorspace conversions required for executing the blending operations, and the second mode maintains color accuracy of the blending operations.

14. The computer-readable memory of claim 13, wherein the PDL used to describe the color documents comprises one or more of:
PDF;
XPS;
PostScript;
PCL;
PPDS;
SVG;
Diablo;
SPL;
IPDS; and
DVI.

15. The computer-readable memory of claim 13, wherein the method is performed on the target device.

16. The computer-readable memory of claim 15, wherein the target device is a printer.

17. The computer-readable memory of claim 13, wherein the method is performed on a computing device coupled to the target device.

18. The computer-readable memory of claim 17, wherein the target device is a printer.

19. A system for processing at least one color document, the system comprising:
 an input interface configured to receive PDL print data describing the at least one color document;
 a memory configured to store the PDL print data; and
 a processor coupled to the input interface and the memory, wherein the processor is configured to execute instructions in the memory to perform steps in a method for processing the at least one color document using one of at least two modes, wherein the color document comprises a hierarchy of nested PDL groups, wherein:
  the processor determines if a user has enabled a fast mode printing;
  the processor processes the at least one color document using a first mode if the user has enabled the fast mode printing, the first mode comprising:
   replacing a first specified colorspace associated with a first PDL group in the hierarchy of nested PDL groups with a second colorspace, wherein the second colorspace is native to a target device,
   blending the first PDL group with a first parent PDL group in the hierarchy using the second colorspace, and
   iteratively blending subsequent PDL groups with subsequent parent PDL groups using the second colorspace until all nested PDL groups have been processed; and
  processing the at least one color document using a second mode if the user has not enabled the fast mode printing, the a second mode comprises:
   blending the first PDL group with the first parent PDL group using a third colorspace associated with the first parent PDL group, and
   iteratively blending subsequent PDL groups with subsequent parent PDL groups using colorspaces associated with the subsequent parent PDL groups until all nested PDL groups have been processed;
  wherein the first mode minimizes the number of colorspace conversions required for executing the blending operations, and the second mode maintains color accuracy of the blending operations.

20. The system of claim 19, wherein the target device is a printer.

* * * * *